US006655589B1

(12) United States Patent
Humber

(10) Patent No.: US 6,655,589 B1
(45) Date of Patent: Dec. 2, 2003

(54) IDENTIFICATION INVESTIGATING AND TICKET ISSUING SYSTEM

(76) Inventor: De Wayne Humber, 14298 Valley View Ridge, Tyler, TX (US) 75709

(*) Notice: Subject to any disclaimer, the term of this patent is extended or adjusted under 35 U.S.C. 154(b) by 159 days.

(21) Appl. No.: 09/944,024

(22) Filed: Aug. 31, 2001

(51) Int. Cl.[7] .................................................. G06F 7/08
(52) U.S. Cl. ........................................ 235/449; 235/381
(58) Field of Search ........................ 235/472.01–472.03, 235/385, 383, 380, 382, 492, 493, 449

(56) References Cited

U.S. PATENT DOCUMENTS

| | | | | | |
|---|---|---|---|---|---|
| 5,640,002 | A | * | 6/1997 | Ruppert et al. | 235/462.46 |
| 5,984,182 | A | * | 11/1999 | Murrah et al. | 235/383 |
| 6,271,815 | B1 | * | 8/2001 | Yang et al. | 345/82 |
| 6,394,344 | B1 | * | 5/2002 | Katsumura et al. | 235/380 |
| 6,497,368 | B1 | * | 12/2002 | Friend et al. | 235/472.01 |

FOREIGN PATENT DOCUMENTS

| | | | |
|---|---|---|---|
| JP | 404241086 A | * | 8/1992 |
| WO | WO 9810368 | * | 3/1998 |

* cited by examiner

*Primary Examiner*—Thien M. Le

(57) ABSTRACT

An identification investigating and ticket issuing system for investigating an identification of a person and for issuing tickets. The identification investigating and ticket issuing system includes a housing that has an interior. The housing also includes an elongated slot for selectively receiving the identification. The housing also includes an elongated aperture providing access into the interior of the housing. An input assembly may be mounted on the top wall of the housing for inputting data. The input assembly includes a data reading means for reading a computer readable magnetic tape mounted on the identification. A transceiver assembly is mounted in the interior of the housing for remotely communicating with a computer. A display is pivotally mounted on the housing for displaying data entered into the input assembly. A printer assembly is mounted in the interior of the housing for printing a ticket.

17 Claims, 4 Drawing Sheets

IDENTIFICATION INVESTIGATING AND TICKET ISSUING SYSTEM

BACKGROUND OF THE INVENTION

1. Field of the Invention

The present invention relates to identification investigative devices and more particularly pertains to a new identification investigating and ticket issuing system for investigating an identification of a person and for issuing tickets.

2. Description of the Prior Art

The use of identification investigative devices is known in the prior art. More specifically, identification investigative devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,124,920; 4,998,753; 4,828,406; 5,396,233; 4,982,072; and Des. 399,198.

While these devices fulfill their respective, particular objectives and requirements, the aforementioned patents do not disclose a new identification investigating and ticket issuing system. The inventive device includes a housing that includes an interior. The housing also includes an elongated slot for selectively receiving the identification. The elongated slot extends from the second end of the housing toward the first end of the housing. The housing also includes an elongated aperture providing access into the interior of the housing. An input assembly may be mounted on the top wall of the housing for inputting data about a person. The input assembly includes a data reading means for reading the computer readable magnetic tape on the identification. A transceiver assembly is mounted in the interior of the housing for remotely communicating with a computer. A display is pivotally mounted on the housing for displaying data entered into the input assembly and a printer assembly is mounted in the interior of the housing for printing a ticket.

In these respects, the identification investigating and ticket issuing system according to the present invention substantially departs from the conventional concepts and designs of the prior art, and in so doing provides an apparatus primarily developed for the purpose of investigating an identification of a person and for issuing tickets.

SUMMARY OF THE INVENTION

In view of the foregoing disadvantages inherent in the known types of identification investigative devices now present in the prior art, the present invention provides a new identification investigating and ticket issuing system construction wherein the same can be utilized for investigating an identification of a person and for issuing tickets.

The general purpose of the present invention, which will be described subsequently in greater detail, is to provide a new identification investigating and ticket issuing system apparatus and method which has many of the advantages of the identification investigative devices mentioned heretofore and many novel features that result in a new identification investigating and ticket issuing system which is not anticipated, rendered obvious, suggested, or even implied by any of the prior art identification investigative devices, either alone or in any combination thereof.

To attain this, the present invention generally comprises a housing that includes an interior. The housing also includes an elongated slot for selectively receiving the identification. The elongated slot extends from the second end of the housing toward the first end of the housing. The housing also includes an elongated aperture providing access into the interior of the housing. An input assembly may be mounted on the top wall of the housing for inputting data about a person. The input assembly includes a data reading means for reading the computer readable magnetic tape on the identification. A transceiver assembly is mounted in the interior of the housing for remotely communicating with a computer. A display is pivotally mounted on the housing for displaying data entered into the input assembly and a printer assembly is mounted in the interior of the housing for printing a ticket.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new identification investigating and ticket issuing system apparatus and method which has many of the advantages of the identification investigative devices mentioned heretofore and many novel features that result in a new identification investigating and ticket issuing system which is not anticipated, rendered obvious, suggested, or even implied by any of the prior art identification investigative devices, either alone or in any combination thereof.

It is another object of the present invention to provide a new identification investigating and ticket issuing system which may be easily and efficiently manufactured and marketed.

It is a further object of the present invention to provide a new identification investigating and ticket issuing system which is of a durable and reliable construction.

An even further object of the present invention is to provide a new identification investigating and ticket issuing system which is susceptible of a low cost of manufacture with regard to both materials and labor, and which accordingly is then susceptible of low prices of sale to the consuming public, thereby making such identification investigating and ticket issuing system economically available to the buying public.

Still yet another object of the present invention is to provide a new identification investigating and ticket issuing system which provides in the apparatuses and methods of the prior art some of the advantages thereof, while simultaneously overcoming some of the disadvantages normally associated therewith.

Still another object of the present invention is to provide a new identification investigating and ticket issuing system for investigating an identification of a person and for issuing tickets.

Yet another object of the present invention is to provide a new identification investigating and ticket issuing system which includes a housing that includes an interior. The housing also includes an elongated slot for selectively receiving the identification. The elongated slot extends from the second end of the housing toward the first end of the housing. The housing also includes an elongated aperture providing access into the interior of the housing. An input assembly may be mounted on the top wall of the housing for inputting data about a person. The input assembly includes a data reading means for reading the computer readable magnetic tape on the identification. A transceiver assembly is mounted in the interior of the housing for remotely communicating with a computer. A display is pivotally mounted on the housing for displaying data entered into the input assembly and a printer assembly is mounted in the interior of the housing for printing a ticket.

Still yet another object of the present invention is to provide a new identification investigating and ticket issuing system that reduce the amount of time a user, such as a police office must stand in traffic writing down information about a stopped person. Reducing the amount of time a police officer must stand in traffic reduces the likelihood of the police officer being injured by being hit by a passing vehicle.

Even still another object of the present invention is to provide a new identification investigating and ticket issuing system that permits a police officer to maintain visual contact of a stopped person while investigating whether the person has any warrants or suspended license. The new system reduces the amount of time a police office must look down to write instead of looking at the person stopped.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED'EMBODIMENT

Figure 1:
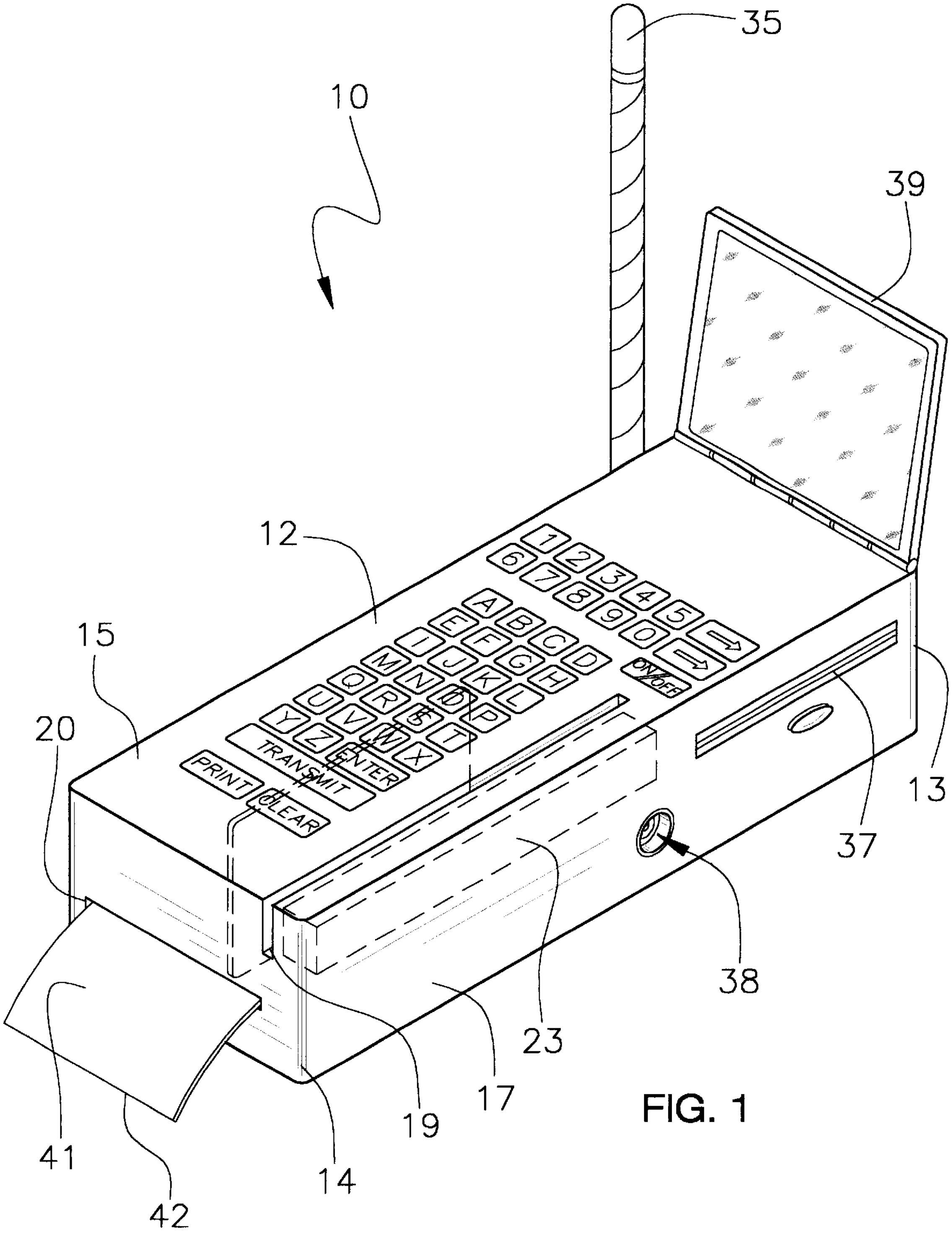
FIG. 1 is a schematic perspective view of a new identification investigating and ticket issuing system according to the present invention.
Figure 2:
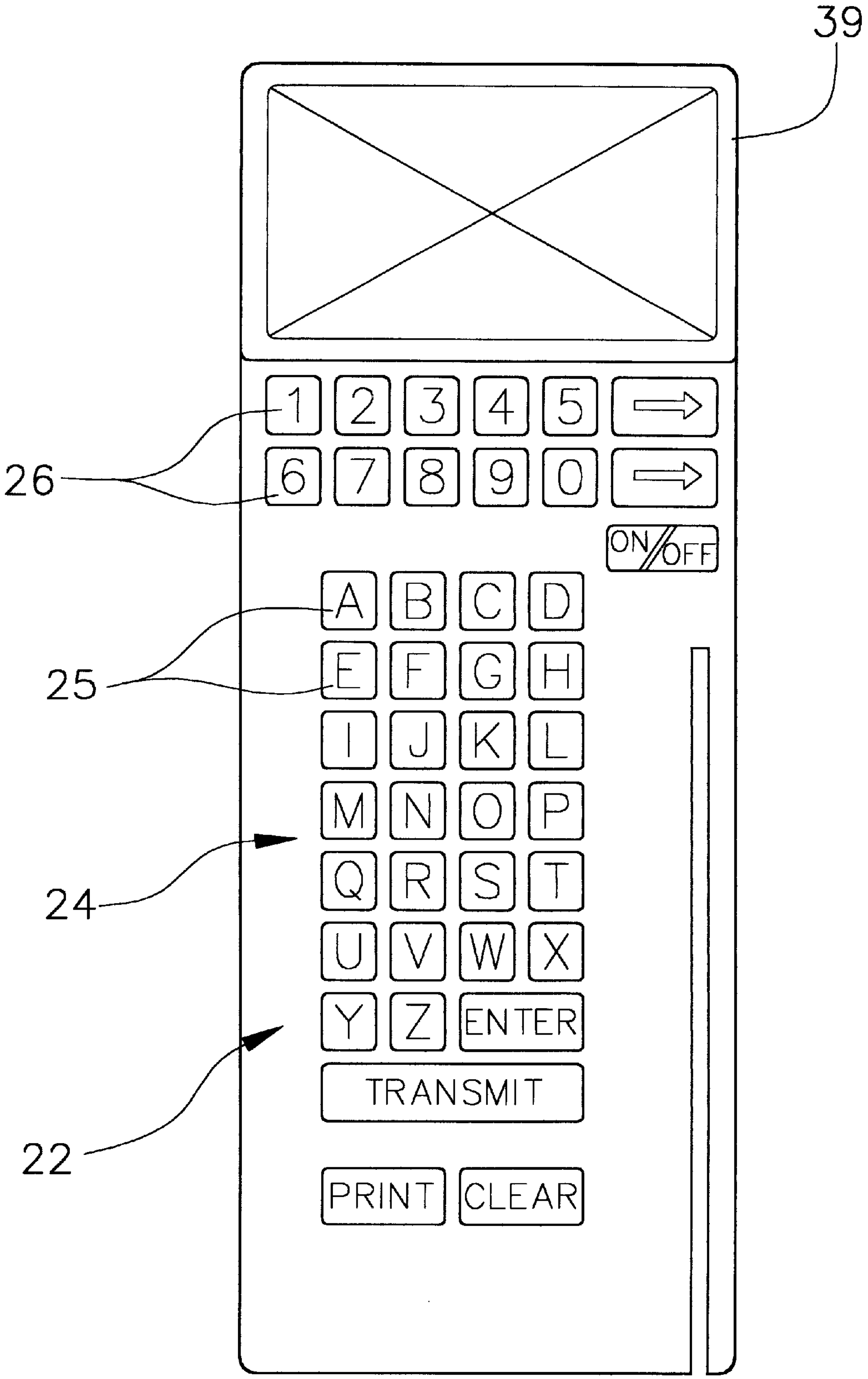
FIG. 2 is a schematic, frontal view of the present invention.
Figure 3:
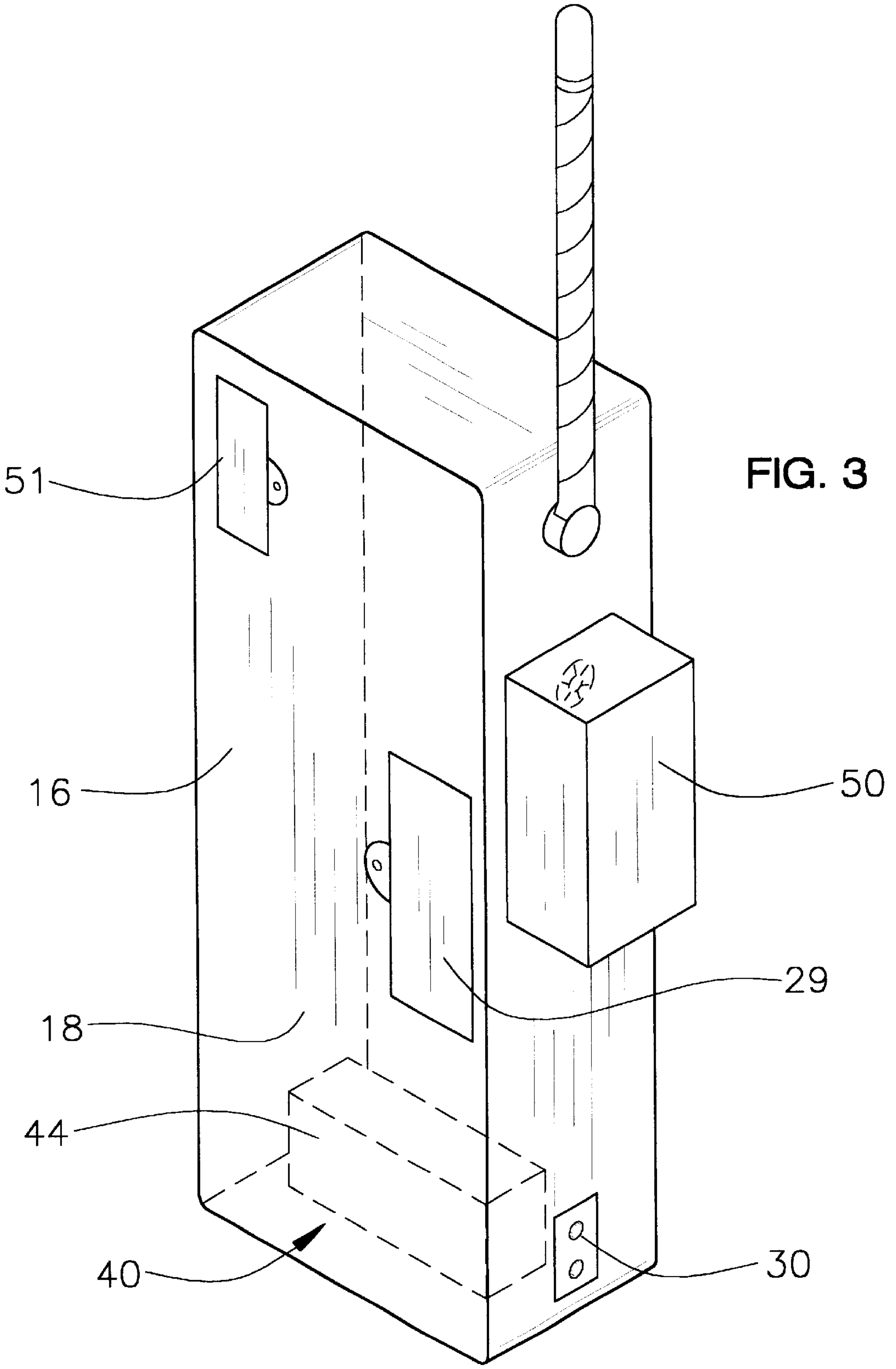
FIG. 3 is a schematic rear view of the present invention.
Figure 4:
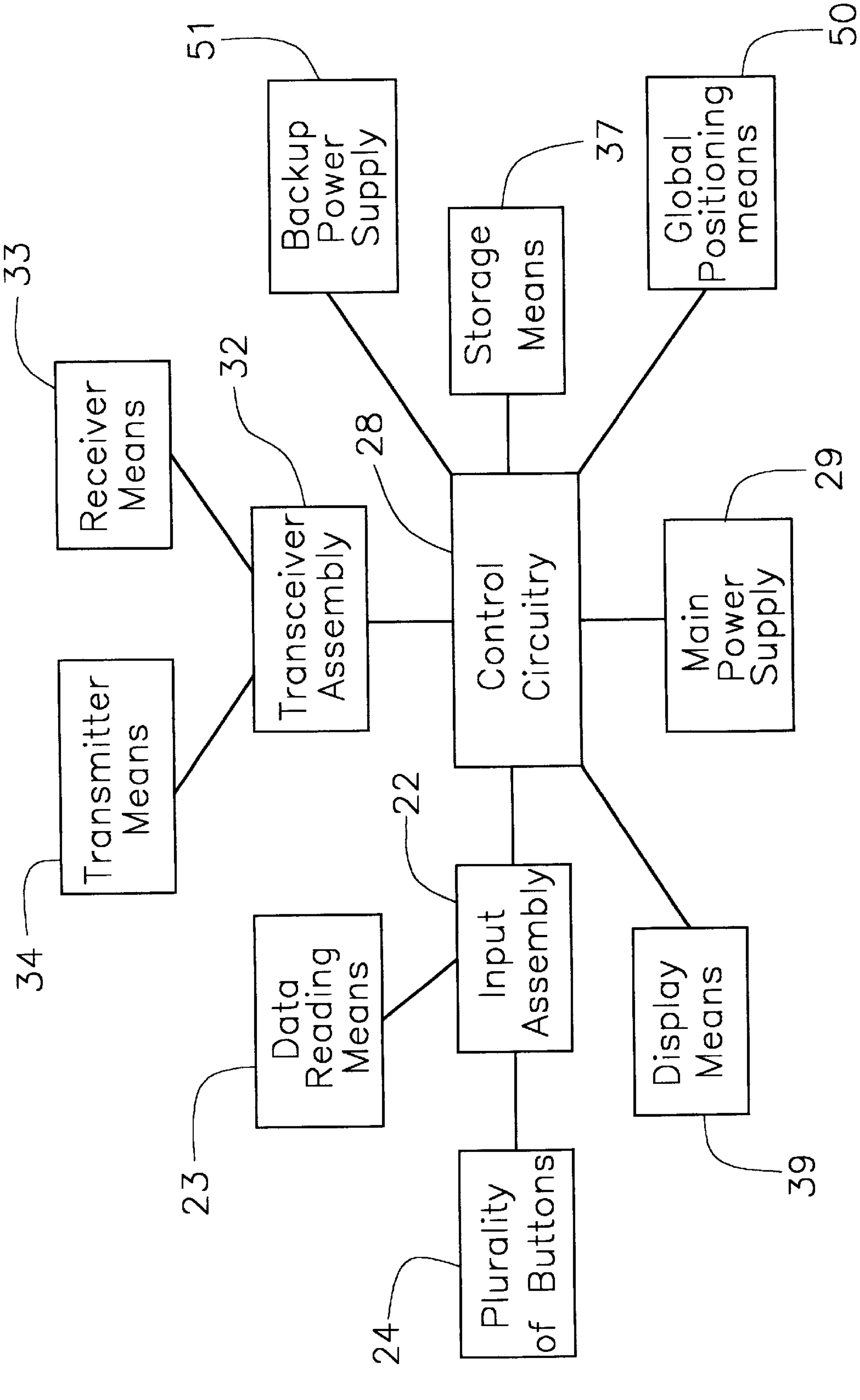
FIG. 4 is a schematic diagram of the present invention.

With reference now to the drawings, and in particular to FIGS. 1 through 4 thereof, a new identification investigating and ticket issuing system embodying the principles and concepts of the present invention and generally designated by the reference numeral 10 will be described.

As best illustrated in FIGS. 1 through 4, the identification investigating and ticket issuing system 10 generally comprises a housing 12 that includes a first end 13 and a second end 14 opposite the first end 13. The housing 12 includes a top wall 15, a bottom wall 16 and a pair of side walls 17 extending between the top 15 and bottom 16 walls of the housing 12 defining an interior 18 of the housing 12.

The second end 14 of the housing 12 includes an elongated slot 19 for selectively receiving the identification of a person. The elongated slot 19 preferably extends from the second end 14 of the housing 12 toward the first end 13 of the housing 12. The elongated slot 19 preferably extends through the top wall 15 of the housing 12 such that the identification is insertable in the top wall 15 of the housing 12 and pulled or swiped downwardly toward the second end 14 of the housing 12. The housing 12 may include a longitudinal axis extending between the first 13 and second 14 ends of the housing 12.

The second end 14 of the housing 13 also includes an elongated aperture 20 extending into the interior 18 of the housing 12. The elongated aperture 20 may include a longitudinal axis orientated generally perpendicular to the elongated slot 19.

The housing 12 may comprise a substantially rigid material such as, for example, a plastic or metal material. The housing 12 may also preferably water resistant permitting it to be used in adverse weather conditions. The housing 12 may measure approximately four inches in height, six inches in width and eleven inches in length. However, the housing may employ a variety of shapes and sizes.

An input assembly 22 is provided for inputting data about a person into the identification investigating and ticket issuing system 10. The input assembly 22 is preferably mounted on the top wall 15 of the housing 12. The input assembly 22 includes a data reading means 23 for reading the computer readable magnetic tape on the identification. The data reading means 23 is mounted in the interior 18 of the housing 12 and is preferably positioned generally adjacent to the elongated slot 19 such that when the identification is positioned in the elongated slot 19 the data reading means 23 reads the data contained on the magnetic tape.

The input assembly 22 may also include a plurality of buttons 24 for selectively receiving a finger of a user. Each of the buttons 24 may be depressibly mounted on the top wall 15 of the housing 12. The plurality of buttons 24 may include a plurality of alphabetical buttons 25 for inserting letters and a plurality of numerical buttons 26 for inputting numbers. Other types of buttons may be employed for operating the identification investigating and ticket issuing system 10 such as, for example, a power button, an enter button, a clear button, a print button, or transmit button.

Control circuitry 28 may be provided for controlling the input and output of data. The control circuitry 28 is preferably mounted in the interior 18 of the housing 12. The control circuitry 28 may be electrically connected to the data reading means 23.

A main power supply 29 may be provided for selectively providing power to the control circuitry 28. The main power supply 29 may be removably mounted in the interior 18 of the housing 12. The main power supply 29 may comprise a rechargeable battery permitting extended usage of the identification investigating and. ticket issuing system 10.

A backup power supply 51 may be mounted in said interior 18 of the housing 12 for supplying power to the control circuitry 28 if the main power supply 29 fails. The backup power supply 51 may comprise a lithium ion battery for extended life. The backup power supply 51 prevents the loss of data due to a loss of power from the main power supply 29.

An electrical socket 30 may be provided for selectively receiving an electrical cord for recharging the main power supply 29. The electrical socket 30 may be mounted on one of the side walls 17 of the housing 12 and may be electrically connected to the main power supply 29.

A transceiver assembly 32 is provided for permitting the identification investigating and ticket issuing system 10 to remotely communicate with a computer such as a police computer containing a database of data pertaining to motorists. The transceiver assembly 32 is mounted in the interior 18 of the housing 12. The transceiver assembly 32 may include a receiver means 33 for receiving data from the computer. The receiver means 33 may be electrically connected to the control circuitry 28.

The transceiver assembly 32 may also include a transmitter means 34 for transmitting data received by the input assembly 22. The transmission means 34 may be electrically connected to the control circuitry.

An antenna 35 may be provided for receiving and transmitting data from the receiver 33 and transmitter 34 means. The antenna 35 may be pivotally mounted on one of the side walls 17 of the housing 12. The antenna 35 may be removably mounted on the side wall 17 of the housing 12 for transportation.

A storage means 37 may be provided for storing data entered in the input assembly 22. The storage means 37 may be mounted in the interior 18 of the housing 12 and may be position generally adjacent to one of the side walls 17 of the housing 12. The storage means 37 may comprise a disk-drive. The storage means 37 may also comprise a drive and a removable storage medium removably positionable in the drive such as, for example a floppy drive and floppy disks, a compact disk drive and compact disks, or high capacity storage drives and high capacity storage disks.

A data port 38 may be provided for selectively receiving a data cable of a computer. The data port 38 permits transferring of data between the storage means 37 and the computer. The data port 38 may be mounted on one of the side walls 17 of the housing 12.

A display 39 is provided for displaying data entered into the input assembly 22. The display 39 may be pivotally mounted on the housing 12 and may be positioned generally adjacent to the first end 13 of the housing 12. The display 39 is preferably electrically connected to the control circuitry 28. The display 39 may comprise a liquid crystal display or an active matrix display. Other types of conventional displays may be employed.

A printer assembly 40 is mounted in the interior 18 of the housing 12 for printing tickets. The printer assembly 40 may be positioned generally adjacent to the second end 14 of the housing 12. The printer assembly 40 may include a substrate 41 for receiving indicia. The substrate 41 may be positioned generally adjacent to the second end 14 of the housing 12. The substrate 41 preferably includes an end 42 that is extendable through the elongated aperture 20 in the second end 14 of the housing 12. The substrate 41 may comprise a paper material.

The printer assembly 40 may also include a printer means 44 for printing indicia on the substrate 41. The printer means 44 may be positioned generally adjacent to the second end 14 of the housing 12. The substrate 41 may be coupled to the printer means 44 such that when the printer means 44 prints indicia on the substrate 41 the substrate 41 is advanced through the elongated aperture 20 in the second end 14 of the housing 12.

A global positioning means 50 may be removably mounted on the housing 12 for receiving a signal from a global positioning satellite. The global positioning means 50 permits a user, such as a police officer to determine their location. Many police vehicles have global positioning systems, however, the technology is of no use to a police officers on foot. The global positioning means 50 mounted on the housing 12 permits a police officer to determine his location when traveling on foot away from his vehicle. The global positioning means 50 may be positioned generally adjacent to one of the side walls 17 of the housing 12.

The global positioning means 50 may be electrically connected to the control circuitry 28 and may receive a signal from a global positioning satellite through the antenna 35.

In use, a user such as, for example, a police officer obtains identification from a person. The police officer then inserts the identification into the elongated slot 19 in the housing 12. The data reading means 23 of the input assembly 22 reads the data contained in the magnetic tape mounted on the identification. The data on the magnetic tape of the identification is stored in the storage means 37.

The transmitter means 34 of the transceiver assembly 32 transmits the data to a computer containing a database of information on the person stopped by the police officer. The information in the database of the computer is transmitted and received by the receiver means 33 of the transceiver assembly 32. The data received by the receiver means 33 is then displayed on the display 33 where it may be read by the police officer.

The police officer may, if issuing a ticket, depress the plurality of buttons 24 of the input assembly 22 to input the type and amount of the ticket. The printer means 44 of the printer assembly 40 prints indicia on the substrate 41 of the printer assembly 40 which is advanced through the second end 14 of the housing 12. The police officer may then tear the substrate 41 and present it to the person stopped by the police officer.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for investigating an identification of a person and for issuing tickets, the identification comprising a card having a computer readable magnetic tape secured on the card, the computer readable magnetic tape containing pertinent data relating to the person displayed on the identification card, said system being connectable to a computer for transmitting data between said system and the computer, said system being connectable to a data cable of a computer, said system comprising:

a housing having an interior, said housing having an elongated slot for selectively receiving the identification card, said housing having an elongated aperture providing access into said interior of said housing;

an input assembly for inputting data about a person, said input assembly being mounted on said housing, said input assembly including a data reading means for reading the computer readable magnetic tape on the identification card;

a transceiver assembly for remotely communicating with a computer, said transceiver assembly being mounted in said interior of said housing;

a display for displaying data entered into said input assembly, said display being pivotally mounted on said housing;

a printer assembly being mounted in said interior of said housing for printing a ticket; and wherein said print assembly includes a substrate for receiving indicia, said substrate including an end extendable through said elongated aperture in said housing, a printer means for printing indicia on said substrate, and means for advancing said substrate with respect to said printer means such that substrate is advanced through said elongated aperture in said housing when said printer means prints indicia on said substrate.

2. The system of claim 1, where said input assembly additionally includes a plurality of buttons being depressibly mounted on said top wall of said housing for entering alphanumeric information.

3. The system of claim 2, wherein said plurality of buttons includes a plurality of alphabetical buttons for inserting letters and a plurality of numerical buttons for inputting numbers.

4. The system of claim 1, additionally including control circuitry for controlling the input and output of data, said control circuitry being mounted in said interior of said housing and electrically connected to said data reading means;

a main power supply for selectively power to said control circuitry.

5. The system of claim 4, wherein said main power supply comprises a rechargeable battery.

6. The system of claim 4, additionally including a backup power supply being mounted in said interior of said housing for supplying power to said control circuitry if said main power supply fails.

7. The system of claim 5, additionally including an electrical socket for selectively receiving an electrical cord for recharging said main power supply.

8. The system of claim 1, wherein said transceiver assembly includes:

a receiver means for receiving data from the computer, said receiver means being electrically connected to control circuitry;

a transmitter means for transmitting data received by said input assembly, said transmitter means being electrically connected to said control circuitry; and an antenna for receiving and transmitting data from said receiver and transmitter means, said antenna being pivotally mounted on one of a pair of side walls of said housing.

9. The system of claim 1, additionally including a storage means for storing data entered through said input assembly, said storage means being mounted in said interior of said housing.

10. The system of claim 9, wherein said storage means comprises a disk drive.

11. The system of claim 9, wherein said storage means comprises a drive for recording data on a removable storage medium removably positionable in said drive.

12. The system of claim 9, additionally including a data port for selectively receiving a data cable, said data port permitting transferring of data between said storage means and the computer, said data port being mounted on one of said side walls of said housing.

13. The system of claim 1, wherein said display comprises a liquid crystal display.

14. The system of claim 1, wherein said display comprises an active matrix display.

15. The system of claim 1, wherein said substrate comprises a paper material.

16. A system for investigating an identification of a person and for issuing tickets, the identification comprising a card having a computer readable magnetic tape secured on the card, the computer readable magnetic tape containing pertinent data relating to the person displayed on the identification card, said system being connectable to a computer for transmitting data between said system and the computer, said system being connectable to a data cable of a computer, said system comprising:

a housing having an interior, said housing having an elongated slot for selectively receiving the identification card, said housing having an elongated aperture providing access into said interior of said housing;

an input assembly for inputting data about a person, said input assembly being mounted on said housing, said input assembly including a data reading means for reading the computer readable magnetic tape on the identification card;

a transceiver assembly for remotely communicating with a computer, said transceiver assembly being mounted in said interior of said housing;

a display for displaying data entered into said input assembly, said display being pivotally mounted on said housing;

a printer assembly being mounted in said interior of said housing for printing a ticket; and a global positioning means being removably mounted on said housing for receiving a signal from a global positioning satellite, said global positioning means being electrically connected to control circuitry mounted in said interior of said housing.

17. A system for investigating an identification of a person and for issuing tickets, the identification comprising a card having a computer readable magnetic tape secured on the card, the computer readable magnetic tape containing pertinent data relating to the person displayed on the identification card, said system being connectable to a computer for transmitting data between said system and the computer, said system being connectable to a data cable of a computer, said system comprising:

a housing having an interior, said housing having an elongated slot for selectively receiving the identification card, said housing having an elongated aperture providing access into said interior of said housing;

an input assembly for inputting data about a person, said input assembly being mounted on said housing, said input assembly including a data reading means for reading the computer readable magnetic tape on the identification card;

a transceiver assembly for remotely communicating with a computer, said transceiver assembly being mounted in said interior of said housing;

a display for displaying data entered into said input assembly, said display being pivotally mounted on said housing; and a printer assembly being mounted in said interior of said housing for printing a ticket;

a plurality of buttons being depressibly mounted on said top wall of said housing for entering alphanumeric information, said plurality of buttons including a plurality of alphabetical buttons for inserting letters and a plurality of numerical buttons for inputting numbers;

control circuitry for controlling the input and output of data, said control circuitry being mounted in said interior of said housing and electrically connected to said data reading means;

a main power supply for selectively power to said control circuitry, said main power supply comprising a rechargeable battery;

a backup power supply being mounted in said interior of said housing for supplying power to said control circuitry if said main power supply fails;

an electrical socket for selectively receiving an electrical cord for recharging said main power supply;

wherein said transceiver assembly includes:

a receiver means for receiving data from the computer, said receiver means being electrically connected to control circuitry;

a transmitter means for transmitting data received by said input assembly, said transmitter means being electrically connected to said control circuitry; and an antenna for receiving and transmitting data from said receiver and transmitter means, said antenna being pivotally mounted on one of a pair of side walls of said housing;

a storage means for storing data entered through said input assembly, said storage means being mounted in said interior of said housing, said storage means comprises a drive for recording data on a removable storage medium removably positionable in said drive;

a data port for selectively receiving a data cable, said data port permitting transferring of data between said storage means and the computer, said data port being mounted on one of said side walls of said housing;

wherein said print assembly includes:

a substrate for receiving indicia, said substrate including an end extendable through said elongated aperture in said housing, said substrate comprising a paper material;

a printer means for printing indicia on said substrate; and means for advancing said substrate with respect to said printer means such that substrate is advanced through said elongated aperture in said housing when said printer means prints indicia on said substrate; and a global positioning means being removably mounted on said housing for receiving a signal from a global positioning satellite, said global positioning means being electrically connected to control circuitry mounted in said interior of said housing.

* * * * *